(12) United States Patent
Goldberg et al.

(10) Patent No.: US 10,038,921 B2
(45) Date of Patent: *Jul. 31, 2018

(54) SYSTEMS, METHODS, AND SOFTWARE FOR MOBILE VIDEO DISPLAY AND MANAGEMENT

(71) Applicant: Verint Systems Ltd., Herzilya Pituach (IL)

(72) Inventors: Royee Goldberg, Raanana (IL); Yehonatan Farin, Tel-Aviv (IL)

(73) Assignee: Verint Systems Ltd., Herzilya Pituach (IL)

( * ) Notice: Subject to any disclaimer, the term of this patent is extended or adjusted under 35 U.S.C. 154(b) by 114 days.

This patent is subject to a terminal disclaimer.

(21) Appl. No.: 15/253,968

(22) Filed: Sep. 1, 2016

(65) Prior Publication Data

US 2017/0134762 A1    May 11, 2017

Related U.S. Application Data

(63) Continuation of application No. 14/021,710, filed on Sep. 9, 2013, now Pat. No. 9,462,249.

(60) Provisional application No. 61/698,672, filed on Sep. 9, 2012.

(51) Int. Cl.
| | |
|---|---|
| *H04N 21/2187* | (2011.01) |
| *H04N 21/434* | (2011.01) |
| *H04N 21/262* | (2011.01) |
| *H04N 21/4223* | (2011.01) |
| *H04N 21/44* | (2011.01) |
| *H04N 21/482* | (2011.01) |
| *H04N 21/431* | (2011.01) |
| *G06F 3/0488* | (2013.01) |

(52) U.S. Cl.
CPC ..... *H04N 21/2187* (2013.01); *G06F 3/04883* (2013.01); *H04N 21/26275* (2013.01); *H04N 21/4223* (2013.01); *H04N 21/4312* (2013.01); *H04N 21/4348* (2013.01); *H04N 21/44004* (2013.01); *H04N 21/482* (2013.01); *G06F 2203/04808* (2013.01)

(58) Field of Classification Search
CPC ......... H04N 21/2187; H04N 21/26275; H04N 21/4223; H04N 21/4312; H04N 21/4348; H04N 21/44004; H04N 21/482; G06F 3/04883; G06F 2203/04808
USPC ....................................................... 386/223
See application file for complete search history.

(56) References Cited

U.S. PATENT DOCUMENTS

| | | | |
|---|---|---|---|
| 4,413,277 A | 11/1983 | Murray | |
| 6,002,995 A | 12/1999 | Suzuki | |
| 6,353,461 B1 | 3/2002 | Shore | |
| 9,462,249 B2* | 10/2016 | Goldberg | ................ H04N 9/87 |
| 2012/0221383 A1 | 8/2012 | Shore | |
| 2012/0254713 A1 | 10/2012 | Roth | |

* cited by examiner

*Primary Examiner* — Huy Thanh Nguyen
(74) *Attorney, Agent, or Firm* — Christopher M. Scherer; DeWitt Ross & Stevens S. C.

(57) ABSTRACT

A system, method, and software for mobile video display and management includes acquiring a plurality of streams of video data from a plurality of cameras. The plurality of streams of video data are stored and plurality of selected streams of video data that includes at least one stream of recorded video data and at least one stream of live video data are presented in a graphical user interface of a remote device.

20 Claims, 8 Drawing Sheets

SYSTEMS, METHODS, AND SOFTWARE FOR MOBILE VIDEO DISPLAY AND MANAGEMENT

CROSS-REFERENCE TO RELATED APPLICATION

This application is a Continuation of U.S. patent application Ser. No. 14/021,710, filed on Sep. 9, 2013, and which claims the benefit of U.S. provisional patent application No. 61/698,672, filed on Sep. 9, 2012. The entire contents of each of these applications is hereby incorporated by reference.

BACKGROUND

The present disclosure relates to the field of video display and management systems, and in particular, to mobile video display and management.

Video systems often include video recording devices, encoders, decoders, and client devices, These devices, when combined, allow for video processing of a recorded scene.

Mobile devices can add flexibility to monitor and/or analyze of captured video data. However, currently available systems, methods, and software for mobile video display and management are limited in functionality and utility for video display and management. Therefore, new systems and techniques are needed for mobile video display and management are desired.

BRIEF DISCLOSURE

An embodiment of a method of mobile video display and management includes acquiring a plurality of streams of video data from a plurality of cameras. Each of the plurality of streams of video data is stored as recorded video data. A list of a plurality of cameras with available recorded video data is presented at a remote device. A list of a plurality of cameras with an available stream of video data is presented at a remote device. A first selection of recorded video data for presentation at the remote devices is received. A second selection of an available stream of video data, playback at the remote device is received. The video data of at least the selected recorded video data and the selected available stream of video data are presented at the remote device.

A system for mobile video display and management includes a plurality of video cameras that each capture a stream of video data. A video server receives and stores the streams of video data from each of the plurality of video cameras as recorded video data. A mobile device includes a graphical display upon which a graphical user interface is presented. The graphical user interface is configured to present a plurality of video playback tiles to present streaming video data. At least one video playback tile presents the stream of video data from one of the plurality of video cameras and at least one video playback tile presents a stream of recorded video data from the video server.

A non-transient computer readable medium is programmed with computer readable code that upon execution by a computer processor causes the processor to initialize a graphical user interface presented on a graphical display of a mobile device to present a plurality of video presentation tiles. A stream of video data is received from a video camera in near-real time. The received stream of video data from a video camera in near-real time is presented in one of the plurality of video presentation tiles. A stream of recorded video data captured by video camera and stored on a video server is received. A received stream of recorded video data is presented in one of the plurality of video presentation tiles.

DETAILED DISCLOSURE

Figure 1:
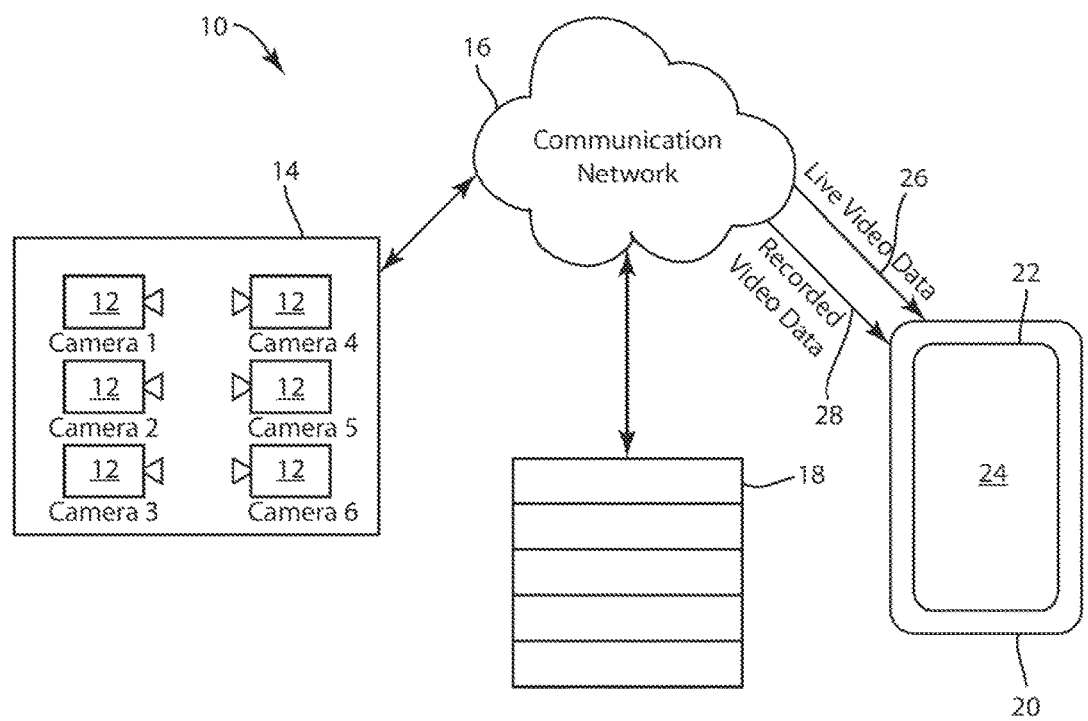
FIG. 1 is a system diagram that depicts an exemplary embodiment of a system for mobile video display and management.

FIG. 1 depicts an exemplary embodiment of a system 10 for mobile video display and management. The system 10 includes a plurality of video camera 12 located at a remote location 14. In embodiments, the video cameras may be any of a variety of digital video cameras, including FPF, codec, resolution, and other types of cameras. The cameras 12 capture digital video data and stream the video data across a communication network 16 to a video server 18 at which the digital video data is stored as recorded video data. The recorded video data can include time stamps that identify the times at which the video data was acquired by the camera 12.

while the remote location 14 is generally depicted as a single location at which all of the cameras 12 are located, it will be understood that this is not intended to be limiting on the scope of the present disclosure as cameras 12 may be distributed at a plurality of locations. Any number of cameras 12 may be distributed at these locations and the acquired digital video data of which may be transferred across the communication network 16 to be stored at the video server 18. In an exemplary embodiment, the communication network 16 may include a local area network (LAN), a wide area network (WAN), internet protocol, or cellular data connection in non-limiting exemplary embodiment. In an embodiment disclosed herein, the video server uses HTTP Live Streaming (HLS) protocol to enable the presentation of live HD video streaming.

A mobile device 20 is further communicatively connected to the communication network 16, and thus to the cameras 12 and the video server 18, as described in further detail herein. In non-limiting embodiments, the mobile device 20 may be any of a variety of mobile devices, including, but not limited to a smart phone, a tablet computer, or a laptop computer. The mobile device 20 includes a graphical display 22 that is configured to present video data in a graphical user interface (GUI) 24 presented on the graphical display 22. In embodiments, the graphical display 22 may be a touch-sensitive graphical display that operates as a user input device in connection with the GUI 24, as may be described in further detail herein. The mobile device 20 is configured to receive live video data 26 and recorded video data 28 from the communication network 16 as described in farther detail herein.

Disclosed herein is a mobile application for execution on a mobile communication device that provides for mobile video display and management. A non-limiting example of such a mobile application is the Nextiva Mobile Application for Nextiva Video Management Software from Verint. Nextiva Mobile™ is a mobile client application from Verint that enables organizations to view Nextiva Video Management Software™ from their Apple iOS-based devices, including the iPad and iPhone. In exemplary embodiments of mobile applications, other operating systems may be supported, such as Android, Palm, Blackberry, and any other suitable operating system. An embodiment of a mobile application allows security operators to remotely access video and enhance operational efficiency and effectiveness by viewing live and recorded video from multiple cameras simultaneously. An exemplary embodiment further provides 10 pre-defined screen layout options, zoom in or out capabilities, and the management of most used and/or recent camera views. With embodiments of this mobile client application, users can stay connected and informed.

Figure 2:
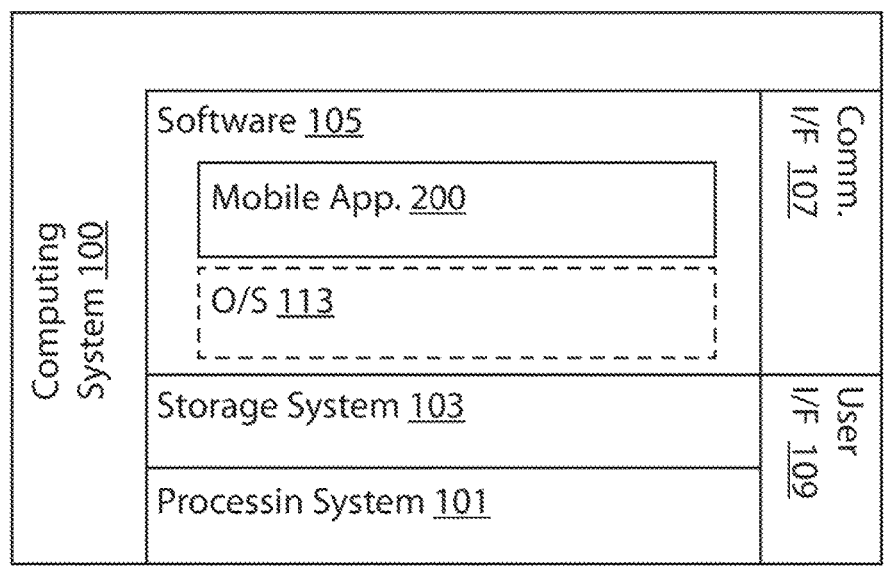
FIG. 2 is a system diagram that depicts an exemplary embodiment of a computing system exemplarily for executing an embodiment of a method or software for mobile video display and management.

In an embodiment, the mobile application may be implemented on a computing device, such as a mobile phone, tablet computer, laptop computer, ultra-book, desktop computer, or any other suitable computing device. FIG. 2 illustrates computing system 100, representative of a suitable computing system for executing an exemplary embodiment of the mobile application, as well as other mobile applications, exemplarily the computing system 100 may be the mobile device as depicted in FIG. 1.

Computing system 100 includes processing system 101, storage system 103, software 105, communication interface 107, and user interface 109. Processing system 101 is operatively coupled with storage system 103, communication interface 107, and user interface 109. Processing system 101 loads and executes software 105 from storage system 103. When executed by computing system 100 in general, and processing system 101 in particular, software 105 directs computing system 100 to operate as described herein for application 111 or operating system 113. Computing system 100 may optionally include additional devices, features, or functionality not discussed here for purposes of brevity and clarity, but as would be recognized by a person having ordinary skill in the art.

Referring still to FIG. 2, processing system 101 may comprise a microprocessor and other circuitry that retrieves and executes software 105 from storage system 103. Processing system 101 may be implemented within a single processing device but may also be distributed across multiple processing devices or sub-systems that cooperate in executing program instructions. Examples of processing system 101 include general purpose central processing units, application specific processors, and logic devices, as well as any other type of processing device, combinations of processing devices, or variations thereof.

Storage system 103 may comprise any storage media readable by processing system 101 and capable of storing software 105. Storage system 103 may include volatile and nonvolatile, removable and non-removable media implemented in any method or technology for storage of information, such as computer readable instructions, data structures, program implementations of this description. Examples of such factors may include, but are not limited to the technology used to implement the storage media of storage system 103 and whether the computer-storage media are characterized as primary or secondary storage.

For example, if the computer-storage media are implemented as semiconductor based memory, software 105 may transform the physical state of the semiconductor memory when the program is encoded therein. For example, software 105 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 100 is generally intended to represent a computing system with which software 105 is deployed and executed in order to implement mobile application 200 (and variations thereof). Embodiments of the mobile application 200 are described herein, exemplarily with respect to FIG. 3. However, computing system 100 may also represent any computing system on which software 105 may be staged and from where software 105 may be distributed, transported, downloaded, or otherwise provided to yet another computing system for deployment and execution, or yet additional distribution.

Referring again to FIG. 2, communication interface 107 may include communication connections and devices that allow for communication between computing system 100 and other computing systems (not shown) over a communication network or collection of networks (not shown). Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 109 may include a mouse, a voice input device, a touch input device for receiving a gesture from a user, a motion input device for detecting non-touch gestures and other motions by a user and other comparable input devices and associated processing elements capable of receiving user input from a user. Output devices such as a display, speakers, haptic devices, and other types of output devices may also be included in user interface 109. The aforementioned user input devices are well known in the art and need not be discussed at length here. User interface 109 may also include associated user interface software executable by processing system 101 in support of the various user input and output devices discussed above. Separately or in conjunction with each other and other hardware and software elements, the user interface software and devices may provide a graphical user interface, a natural user interface, or any other kind of user interface.

Figure 3:
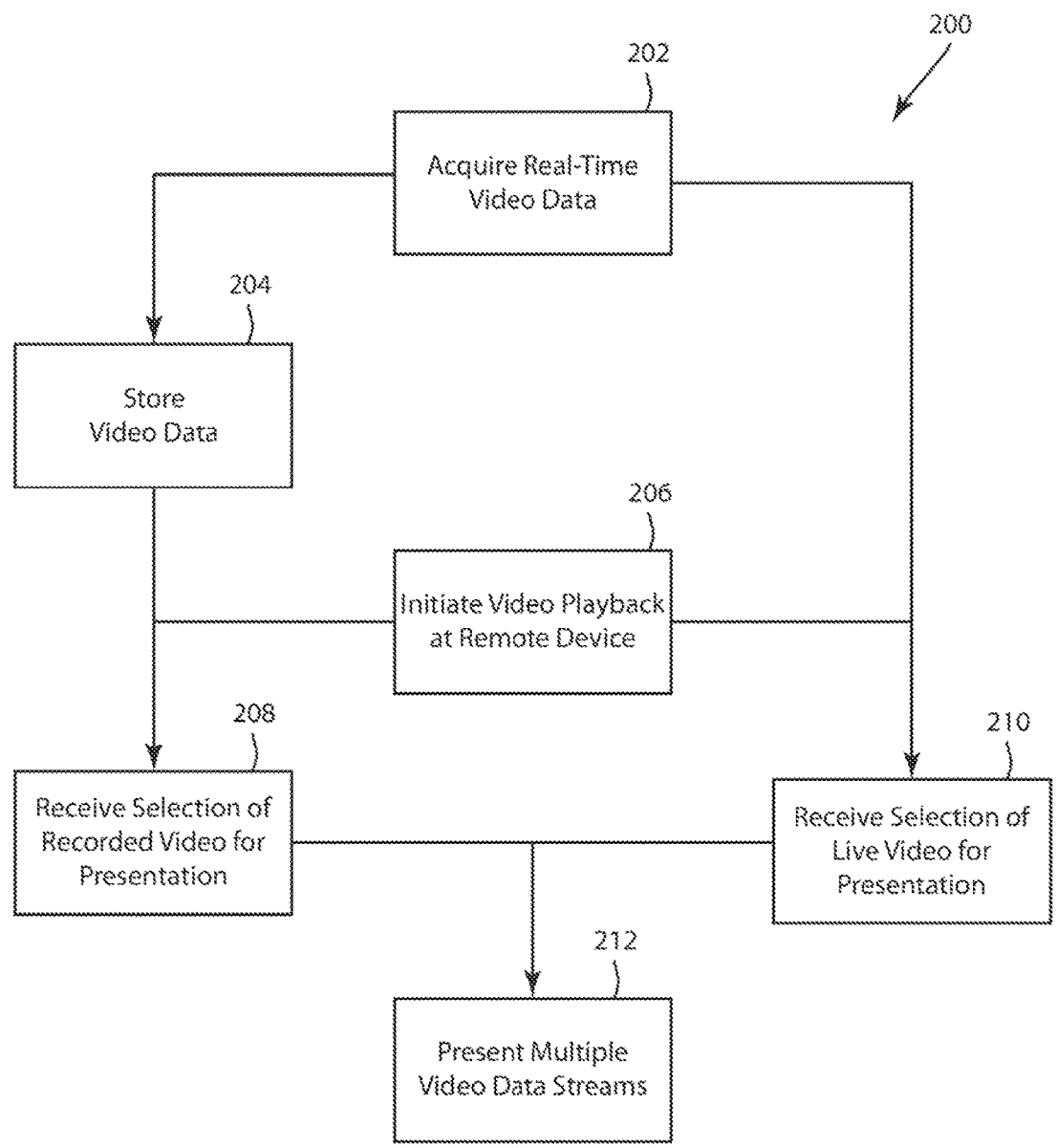
FIG. 3 is a flowchart that depicts exemplary embodiment of a method of mobile video display.

FIG. 3 is a flowchart that depicts an exemplary embodiment of a method of mobile video display. Exemplary embodiments of the method 200 may be carried out on the computer system 100 as described above with respect to FIG. 2 and as part of the system for mobile video display and management 10 as described above with respect to FIG. 1.

The method 200 begins at 202 with the acquisition of real-time video data. The video data is acquired by a plurality of video cameras that may be arranged at a remote location. In an exemplary embodiment, the video cameras may be deployed for surveillance, while in other embodiments, the cameras may be deployed for a variety of other video monitoring purposes. The video data acquired at 202 may be digital video data that is transmitted from the video camera across a communications network. It may be understood that in embodiments, an intermediate computer or processor may be located between each individual camera that acquires the real-time video data and the communication network, and such a computer or processor may preprocess or package the video data in a manner to facilitate the transmission of the video data.

The acquired real-time video data is stored at 204, exemplarily as recorded video data at a video server. The stored video data may be stored along with indications of the camera that acquired the video data as well as at least one time stamp of when the video data was acquired. In an embodiment, the video server is an HLS video server that enables streaming of video data from the video server according to the HLS protocol, enabling the streaming of high definition (HD) video to the mobile device.

At 206 video playback at the remote device is initiated. As will be described in further detail herein, a mobile app may be executed at the remote device such as to open a graphical user interface that facilitates the streaming presentation of video data, either recorded video data or live video data. In embodiments as disclosed in further detail herein, the GUI presented at the remote device includes a plurality of video presentation tiles, each of which is configured to present streaming video data. The GUI presented at the mobile device is further operable to present a list or a plurality of selections, exemplarily in a drop down menu or a list menu that identifies each of the cameras from which recorded video data is available and it is further operable to present a menu or list of cameras for which live video data is available.

At 208 a selection of recorded video for playback is received. In an embodiment, a user input is received with respect to a menu or list in the GUI that presents the cameras from which available recorded video, stored at the video server, was obtained. At 210 a selection of live video for presentation is received. Exemplarily, the selection of live video for presentation is received by receiving a user input associated with a menu or list presented in the GUI of the cameras for which the live video is available. At 212 multiple video data streams are presented at the remote device. In an embodiment, the GUI at the remote device presents a plurality of video presentation tiles and at least one video presentation tile presents recorded video data and at least another of the video presentation tiles presents live video data, as selected at 208 and 210.

In an embodiment, a delay in the stream of live video data from the cameras that acquire real-time video data at 202 to the presentation of the live video data at the remote device at 212. This delay may be due to buffering, available bandwidth, or other data connectivity issues across the communication network, between the cameras, or at the remote device. In other instances, this delay may be due to software analysis or processing that is performed on the video data prior to presentation at the remote device. Therefore, in an embodiment, the live video data gets presented in real-time or near-real time, while acknowledging this delay. In a non-limiting example, the delay may exemplarily be 5 seconds, while in another mere exemplarily embodiment the delay is 30 seconds; however, this is in no way intended to be limiting on the delay between acquisition and presentation of the live video data is disclosed in further detail herein. In embodiments, the live video data is presented in the GUI at the remote device along with a time stamp of the actual time at which the video data was acquired. This can be informative to a user of the mobile application in viewing the live video data to understand context of any delay in the presentation of the video data. Additionally, in an embodiment wherein multiples streams of live video data are presented in the GUI at separate video presentation tiles, the live video data streams may have different length delays exemplarily due to differences in processing of the video data, or the actual data connection from each of the cameras. Therefore, information on the actual time of video acquisition is further helpful to the user in order for the user to understand the context and relationship between the live video images presented in the video presentation tiles.

In a similar manner, when recorded video data is presented in a video presentation tile of the GUI at the remote device, the recorded video data is identified by a date and time range that represents the video data segment selected to be streamed and presented at the video presentation tile. Thus, while in an embodiment of the presentation of the recorded video data, an indication of a buffering or delay may not be included, the similar context is maintained with respect to the recorded video data as the actual time at which the recorded video data was acquired is presented in the video presentation tile.

In a still further embodiment as described in further detail herein, the recorded video data may be presented in a video presentation tile along with a navigation bar. An embodiment of the navigation bar may include a variety of options of navigation within the presentation of the recorded video data. Non-limiting embodiments of the functions and features available through the navigation bar may include "jump forward" and "jump backwards" options. In an exemplary embodiment, the "jump forward" feature extends the duration of the selected recorded video for playback in the video presentation tile by extending an end time of the selected recorded video data segment by a set amount. In merely exemplary embodiments this set amount may be 5 minutes, 10 minutes, or 15 minutes. Similarly, the "jump backwards" feature may extend the duration of the selected recorded video data segment presented at the video presentation tile by moving the start time of the selected recorded video data segment earlier by a set amount. In one embodiment, in addition to extending the duration of the selected recorded video data for playback, the "jump backward" feature also restarts the streaming of the recorded video data at the new start time.

In still further embodiments as will be described in further detail herein, for cameras for which both live and recorded video data are available, a toggle switch may be presented in the video presentation tile such that a user can switch between the live streaming video acquired by the camera and recorded video data from that same camera. In an exemplary embodiment, the toggle switch may be presented in a navigation bar which is selectively active within the video presentation tile.

Figure 4:
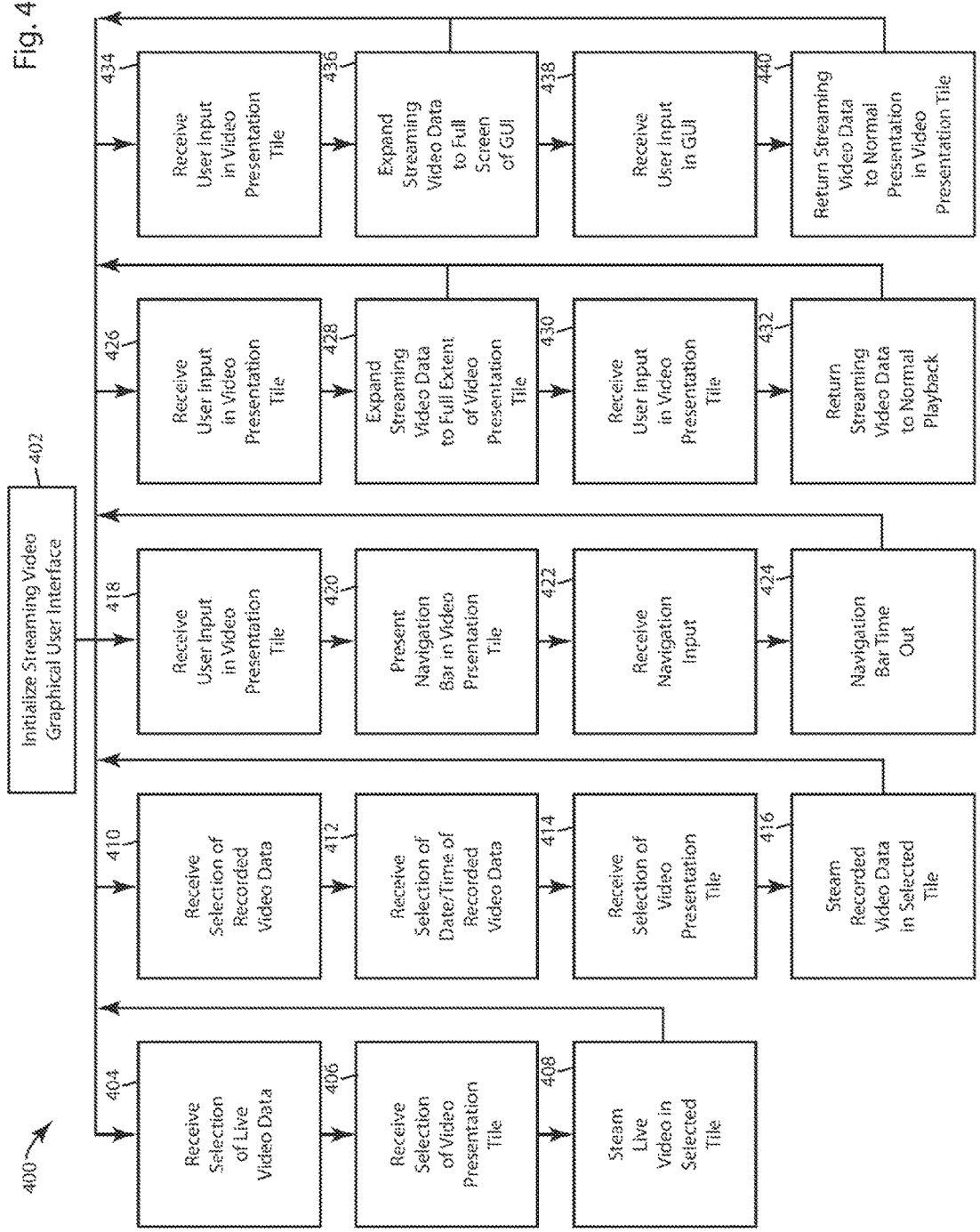
FIG. 4 is a flowchart that depicts an exemplary embodiment of a method of mobile video management.

FIG. 4 is a flow chart that depicts an exemplary embodiment of a method 400 of mobile video management, particularly management of the presentation of streaming video data in the GUI presented at the remote device as described above with respect to FIGS. 1-3. At 402 a graphical user interface for streaming video is initialized. Exemplary embodiments of such a graphical user interface will be described in further detail herein with respect to the exemplary screen shots of such a graphical user interface presented in FIGS. 5-9.

At 404 a selection of live video data is received exemplarily by receiving a user input associated with a selection of a camera from a list or menu of cameras with available live video data. The screen shot of FIG. 5 exemplarily depicts an embodiment of a list of cameras, as will be described in further detail herein. Next, at 406, a selection of a video presentation tile is received. In an exemplary embodiment, the selection may be a user input associated with a particular video presentation tile, such as a tap gesture received by a touch-sensitive display within one of the video presentation tiles. In a still further embodiment, the selections of 404 and 406 may exemplarily be a drag and drop input from the list of available cameras to one of the video playback tiles. At 408 live video is streamed in the selected video presentation tile.

At 410 a selection of recorded video data is received. Such a selection of recorded video data may be a user input associated with an identification of a camera from which recorded video data has been acquired. At 412 a selection of a date and time of the recorded video data for presentation is received. Such a selection of a date and/or time may be received by a series of user inputs, exemplarily as prompted by in the exemplary screen shot of a GUI depicted in FIG. 6. After the selection of the date and time of the selected recorded video data is received at 412, then a selection of the video presentation tile which to present the recorded video data is received at 414. The recorded video data is then streamed for presentation in the selected video presentation tile at 416.

In embodiments, once video data, either live or recorded is being presented in one or more video presentation tiles, various user inputs or actions can be taken to manipulate or modify the presentation of the video data in the graphical user interface.

At 418 a user input is received in a video presentation tile that is presenting streaming video data. In a non-limiting embodiment, the user input may be a single finger single tap gesture received with a touch sensitive graphical display of the remote device. At 420 the received user input brings up a navigation bar within the video presentation tile. A merely exemplary embodiment of a navigation bar is depicted in the exemplary screen shot found in FIG. 8 and the navigation bar may include a slide bar for a user to navigate within a selection of recorded video data, or to toggle between recorded video and live video data, if available. In still further embodiments, as described above, a "jump backward" feature or a "jump forward" feature may be available to modify the duration of a selected recorded video data for presentation.

At 422 a navigation input is received in the navigation bar. The presentation of the streaming video in the video presentation tile is modified according to the received navigation input, exemplarily to change the time of the video data, or to increase the duration of the received video data. At 424, the GUI may operate to remove or hide the navigation bar if the navigation bar "times out" without receiving a user input. Such a "time out" may occur if exemplarily 10 or 15 seconds elapses without a user input in the navigation bar.

At 426 a user input may be received in a video presentation tile that is currently presenting a stream of video data, which may be live video data or may be recorded video data. In a non-limiting embodiment, the user input may be a single finger double tap gesture received by a touch sensitive graphical display of the remote device. Upon receiving this input, at 428, the streaming video data is expanded to the full extent of the video presentation tile. Thus, by a single user input, the user can expand the streaming video data to fill the extent of the video presentation tile for expanded viewing of the streaming video data. In an exemplary embodiment, a user may be able to define a setting or make a predetermined selection between multiple expansion techniques. In a first expansion technique, the streaming video data is stretched in the vertical and horizontal dimension to the full area of the video presentation tile. In an alternative embodiment, which may be referred to as a "keep ratio" setting, the aspect ratio of the streaming video data is maintained and presentation of the video data is expanded to the largest size that maintains the streaming video aspect ratio with the video presentation tile. In such an embodiment, a portion of the video presentation tile may not be used if the aspect ratio of the streaming video data does not match the aspect ratio of the video presentation tile. In a still further embodiment of an exemplary "keep ratio" setting, the aspect ratio may be maintained but the streaming video data is expanded such that the entire area of the video presentation tile is used for video presentation, although a portion of the streaming video data may be cropped in either the horizontal or the vertical dimension. Upon receiving a second user input, exemplarily a single finger double tap user input, in the video presentation tile at 430, the streaming video data is returned to a normal playback at 432.

In a still further embodiment, a user m out may be received in a video presentation tile at 434. Exemplarily, this user input may be a double fingered double tap gesture received by a touch sensitive graphical display of the remote device. Upon the receiving such a user input in the video presentation tile, the GUI expands the streaming video data from the video presentation tile to a full screen presentation of the streaming video data within the full screen of the GUI at 436. In an exemplary embodiment, similar expansion settings as described above with respect to 428 may similarly apply to the expansion to the full screen of the GUI at 436. The presentation of the expanded streaming video data may continue until at 438 another user input is received in the GUI, exemplarily another double fingered double tap gesture at which point at 440 the streaming video data is returned to a normal presentation in the original video presentation tile.

Figure 5:
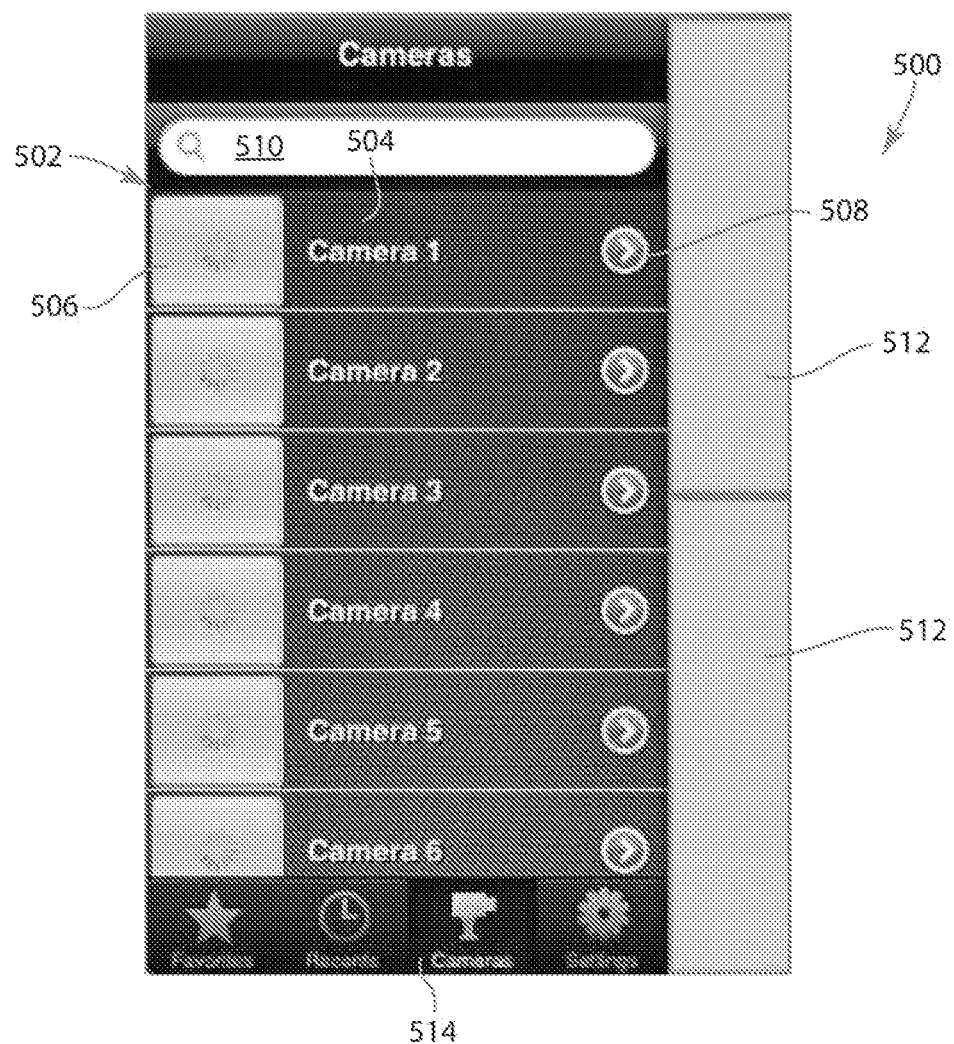
FIG. 5 depicts an exemplary embodiment of a screen shot of a list of available cameras in a graphical user interface.

As stated above, FIGS. 5-9 present exemplary embodiments of screen shots of a graphical use interface in accordance with embodiments of the systems, methods, and software as disclosed herein. FIG. 5 depicts a screen shot 500 of an exemplary embodiment of a list or menu of available cameras. In an embodiment, the list of cameras may list the cameras on a location by location basis, or may present all available cameras or cameras that are available within a particular network. In an exemplary embodiment, the camera list 502 includes a camera name 504, a preview view of the video data acquired at that camera 506 and an accessories or options toggle 508 which is described in further detail herein. In an exemplary embodiment, if a particular camera is offline or unavailable, then an indication may be presented in the preview box 506 to show that there is currently no live video data available. In a still further embodiment, a search box 510 is presented m order for the user to quickly filter or search through camera names.

In a merely exemplary embodiment, the camera list 502 horizontally slides into the graphical user interface in a manner that horizontally displaces video presentation tiles 512 off of the screen as viewed in the GUI. In an exemplary embodiment, by toggling the "camera" button 514 the camera list is introduced or hidden from the GUI and exemplarily, a full view of the video presentation tiles may be returned when the camera list 502 is hidden.

Figure 6:
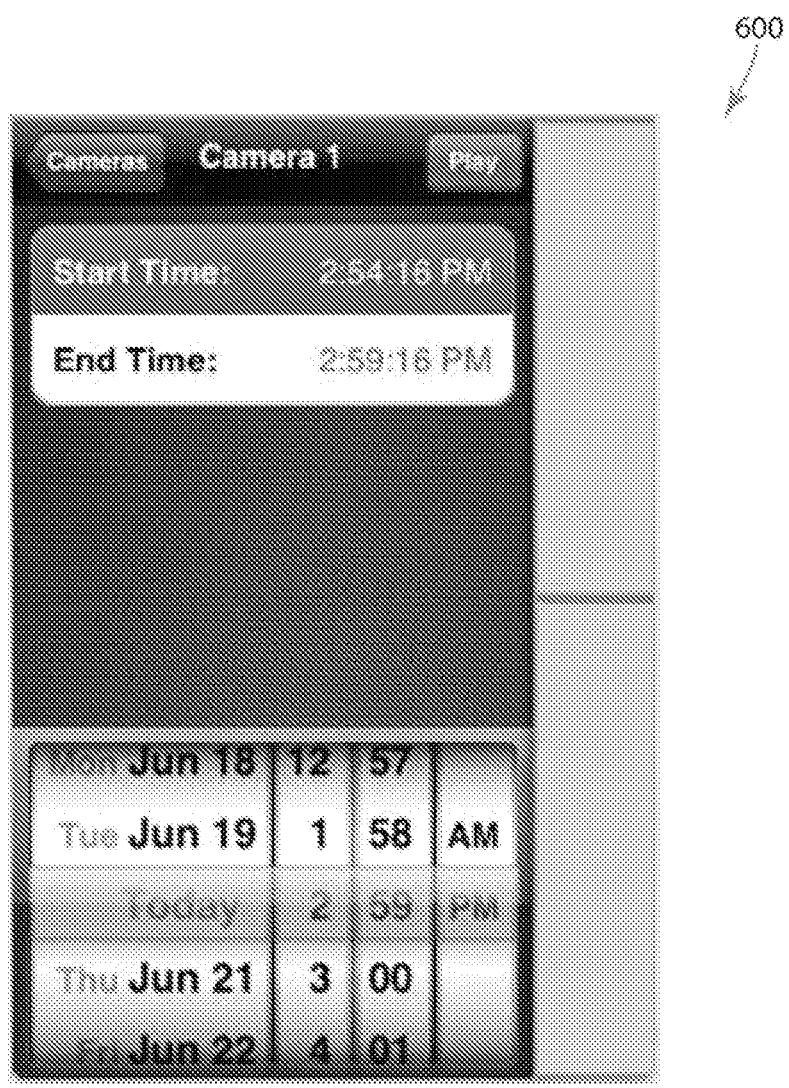
FIG. 6 depicts an exemplary embodiment of a screen shot of a selection of a start time and end time for recorded video data in a graphical user interface.

As reference above, FIG. 6 presents an exemplary embodiment of a screen shot 600 that exemplarily depicts a graphical user interface for the selection of a date and/or time duration of recorded video data for streaming presentation in a video presentation tile. The selected video data may be defined by a combination of a date and a start time and an end time. In the exemplary embodiment, the selected video data would have a duration of 5 minutes, from 2:54 p.m. to 2:59 p.m. on June 20.

Figure 7:
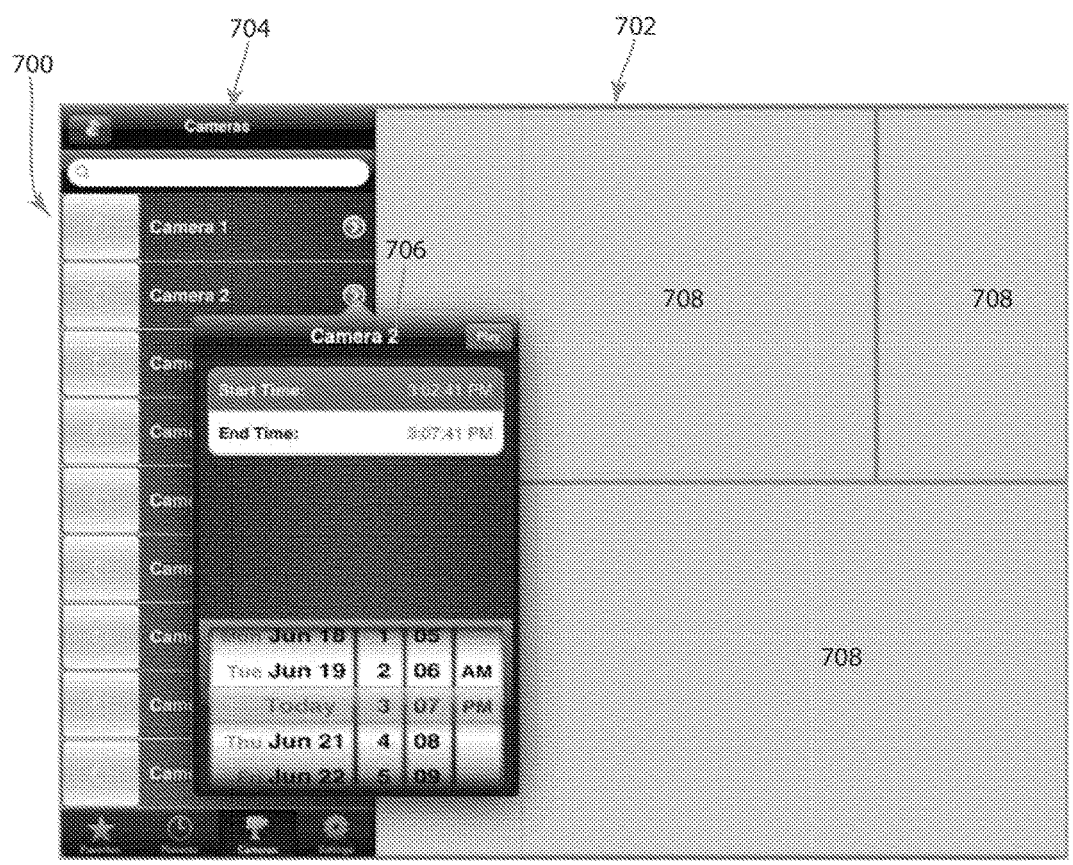
FIG. 7 depicts an exemplary embodiment of a screen shot of a graphical user interface for mobile video display and management.

FIG. 7 depicts an exemplary embodiment of a screen shot 700 of a graphical user interface 702 which may exemplarily be presented on a tablet style mobile device and exemplarily in a horizontal or landscape orientation. The GUI 702 includes a camera list 704 as described above with respect to FIG. 5, and a recorded video selection 706, as described above with respect to FIG. 6. In the GUI 702 of the screen shot 700, a plurality of video presentation tiles 708 are arranged within the GUI 702. In a non-limiting embodiment, the user can select and position the video data from a camera by dragging and dropping the selected camera from the cameras list 704 to one of the video presentation tiles 708. In an exemplary embodiment, the user may drag and drop a selected camera from the camera list 704 into one of the video presentation tiles 708 in order to initiate streaming of a live video stream from that camera, while the user may drag and drop the recorded video data selection box 706 into a video presentation tile 708 in order to initiate streaming video presentation of the selected recorded video data.

In an exemplary embodiment, a default mode may maintain the work space with the video presentation tile 708 always partially visible on a right hand side of the GUI 702. In a non-limiting embodiment, the user may switch between a view of solely the work space comprising the video presentation tile 708 or a combined presentation that includes the camera list 704 by a user input, exemplarily a left or right horizontal sliding gesture. In a still further embodiment, the GUI 702 may be operated in a "pinned" mode. In a "pinned'" mode the left hand view that includes the camera list 704 is maintained and the work space that comprises the video presentation tile 708 is scaled to remain fully visible.

Figure 8:
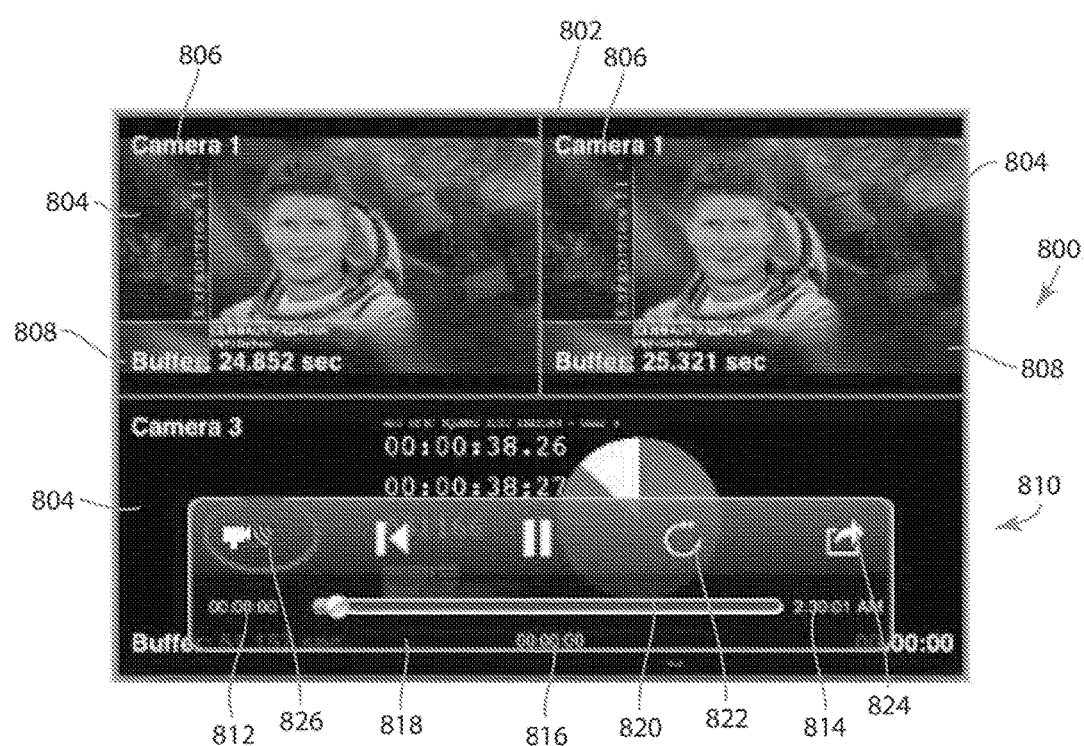
FIG. 8 depicts an exemplary embodiment of a screen shot of a graphical user interface presenting multiple streams of video data on a mobile device.

FIG. 8 depicts an exemplary embodiment of a screen shot 800 of a graphical user interface 802 that presents a plurality of video presentation tile 804 that each present streaming video data. As described above, the presentation of the streaming video data in a video presentation tile 804 may further include an identification of the camera 806 from which the data was acquired and an indication of any buffer, lag, or delay between streaming live video data and when the live video data was acquired. This may also include an indication of the actual time at which the streaming video was acquired.

As exemplarily depicted with camera 3, indicated by numeral 801, the presentation of recorded video data may include an identification of a start time 812 of the selected video data and an end time 814 of the selected video data, and a current time of the streaming video data. A navigation bar 818 may present this information and may also provide a navigation slider 820 that facilitates a user input to navigate within the duration of the selected recorded video data for streaming playback.

The navigation bar 818 may further include a "jump backward'" button 822 and a "jump forward" button 824 that may facilitate a user input to quickly change the recorded video duration by extending the start time earlier by a set amount or extending the end time later by a set amount. As previously noted, in an exemplary embodiment, if the "jump backward" button 822 is selected, the streaming video may restart video presentation at the new modified start time.

As a still further exemplary embodiment, the navigation bar 818 may further include a live/recorded toggle 826 wherein if the video presentation tile is currently presenting a stream of recorded video data, activation of the toggle 826 will present live video from the same camera, if available. Similarly, if live video data from a camera is being streamed to the video presentation tile and the toggle 826 is activated then the user may be prompted to select a time and date to define a duration of recorded video data from that camera to present in the video presentation tile.

Figure 9:
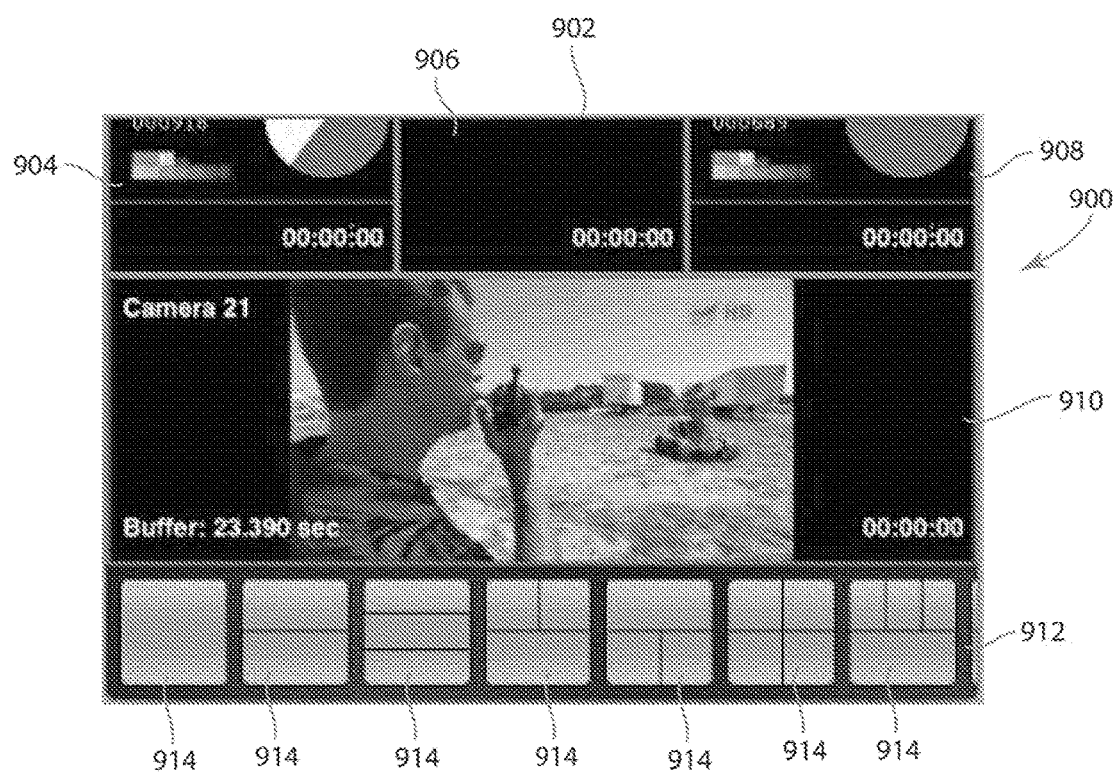
FIG. 9 depicts an exemplary embodiment of a screen shot of a graphical user interface presenting a plurality of video presentation tile layouts.

FIG. 9 depicts a still further exemplary embodiment of a screen shot 900 that depicts an exemplary embodiment of a GUI 902 which includes four video presentation tiles, exemplary 904, 906, 908, and 910. In the exemplary embodiment depicted in FIG. 9, the GUI 902 further includes a layout bar 912 that presents a variety of video presentation tile layouts from which a user may select for the layout of the video presentation tiles in the GUI 902. In an exemplary embodiment, the GUI 902 includes four video presentation tiles, however, it is to be recognized that in alternative embodiments any number of presentation tiles may be contemplated in the present disclosure.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of mobile video display and management, the method comprising:
   acquiring a plurality of streams of live video data from a plurality of cameras;
   presenting, at a remote device, available streams of live video data;
   receiving a selection of one or more available streams of live video data for presentation at the remote device;
   presenting, at the remote device, each selected stream of live video data and a corresponding delay indication that describes how close the stream of live video data is to real-time, and
   maintaining an aspect ratio of each selected stream of live video data.

2. The method of claim 1, wherein the delay indication is a time stamp that identifies the time at which the steam of live video data was acquired by the camera.

3. The method of claim 1, wherein the delay indication comprises a time corresponding to the difference between real time and the current time of the stream of live video data.

4. The method of claim 3, wherein the delay indication comprises an indication of the source of the delay.

5. The method of claim 4, wherein the source of the delay is selected from the group consisting of: buffering, processing, and data connectivity.

6. The method of claim 1, wherein the receiving a selection of one or more available streams of live video data for presentation at the remote device comprises:
presenting a list of cameras that are (i) acquiring the streams of live video data and (ii) available, and
receiving a selection from the list.

7. The method of claim 1, further comprising:
initiating a graphical user interface at the remote device for video data presentation, the graphical user interface comprising a plurality of video presentation tiles;
presenting each selected stream of live video data and its corresponding delay indication in a particular video presentation tile.

8. The method of claim 7, further comprising:
receiving a selection of a graphical user interface layout; and
presenting the plurality of video presentation tiles in the graphical user interface according to the selected graphical user interface layout.

9. The method of claim 8, further comprising:
rearranging the presentation of the stream of live video data in the graphical user interface by receiving one or more dragging inputs to move the presentation of the stream of live video data and its corresponding delay indication to another video presentation tile of the plurality of video presentation tiles.

10. The method of claim 7, further comprising:
receiving a gesture input in a video presentation tile of the graphical user interface; and opening a navigation bar in the video presentation tile.

11. The method of claim 7, further comprising:
receiving a gesture input in a video presentation tile of the graphical user interface; and expanding the stream of live video data presented in the video presentation tile to fill the video presentation tile.

12. The method of claim 7, further comprising:
receiving a gesture input in a video presentation tile of the graphical user interface; and expanding the stream of live video data presented in the video presentation tile to fill the graphical user interface.

13. A system for mobile video display and management, the system comprising:
a plurality of video cameras that each capture a stream of live video data; and
a mobile device communicatively coupled to the video cameras via a communication network, the mobile device comprising a graphical display and a processor, wherein the processor is configured by software to:
acquire streams of live video data from the plurality of video cameras, wherein each stream of live video data includes a time stamp,
compute, using the time stamp, a delay for each stream of live video data,
maintain an aspect ratio of each stream of live video data, and
present each of the streams of live video data and a delay indication in a graphical user interface presented on the graphical display, wherein the delay indication presented with a steam of live video data describes how close the stream of live video data is to real-time.

14. The system of claim 13, wherein the graphical user interface comprises a plurality of video presentation tiles, wherein each video presentation tile displays one of the streams of live video data and the delay indication corresponding to the stream of live video data.

15. The system of claim 14, wherein the graphical user interface comprises a menu of video cameras that are available for streaming live video data, and a user selection from the menu causes the graphical user interface to present the selected stream of live video data in one of the video presentation tiles.

16. The system of claim 13, wherein a camera indication is presented with each stream of live video data in a presentation tile, the camera indication specifying the camera that captured the stream of live video data.

17. The system of claim 13, wherein the delay indication and camera indication are overlaid on the stream of live video data in the video presentation tile.

18. A non-transient computer readable medium programmed with computer readable code that upon execution by a computer processor causes the processor to:
acquire streams of live video data from a plurality of video cameras, wherein each stream of live video data includes a time stamp,
compute, using the time stamp, a delay for each stream of live video data,
maintain an aspect ratio of each stream of live video data, and
present each of the streams of live video data and a delay indication in a graphical user interface, wherein the delay indication presented with a steam of live video data describes how close the stream of live video data is to real-time.

19. The method of claim 6, wherein the presenting the list of cameras comprises:
presenting a camera name of each of the plurality of cameras, and
presenting preview views of the video data acquired at each of the plurality of cameras.

20. The method of claim 19, further comprising searching for a specific camera name using a search box.

* * * * *